July 18, 1967

H. B. COLE 3,331,670

METHOD OF MAKING MULTICHANNELLED ELECTRON MULTIPLIER COMPONENT

Filed Sept. 9, 1963

INVENTOR
HENRY B. COLE

BY *J. Albert Hultquist*

ATTORNEY

July 18, 1967 H. B. COLE 3,331,670
METHOD OF MAKING MULTICHANNELLED ELECTRON MULTIPLIER COMPONENT
Filed Sept. 9, 1963 3 Sheets-Sheet 2
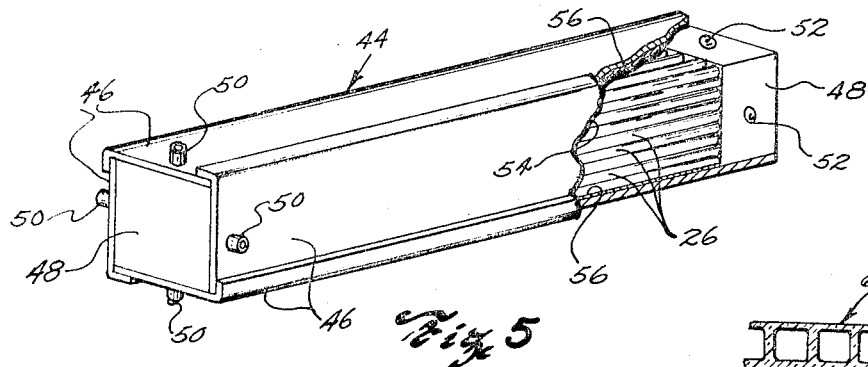
Fig. 5
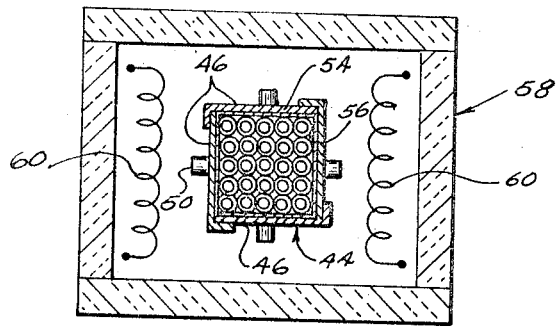
Fig. 6
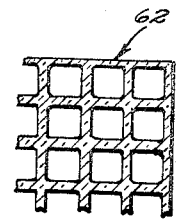
Fig. 8
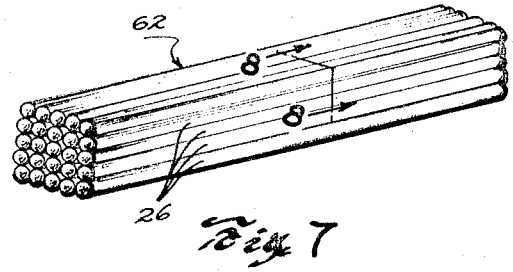
Fig. 7
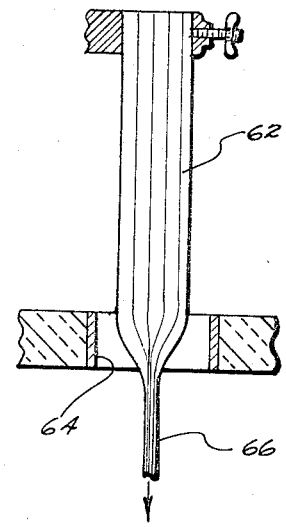
Fig. 9
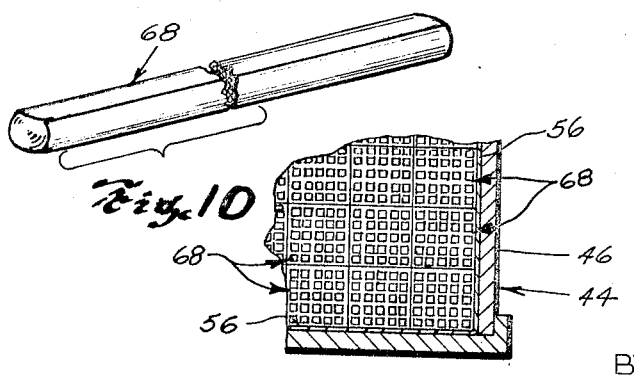
Fig. 10
Fig. 11
INVENTORS
HENRY B. COLE
BY J. Albert Vultquist
ATTORNEY

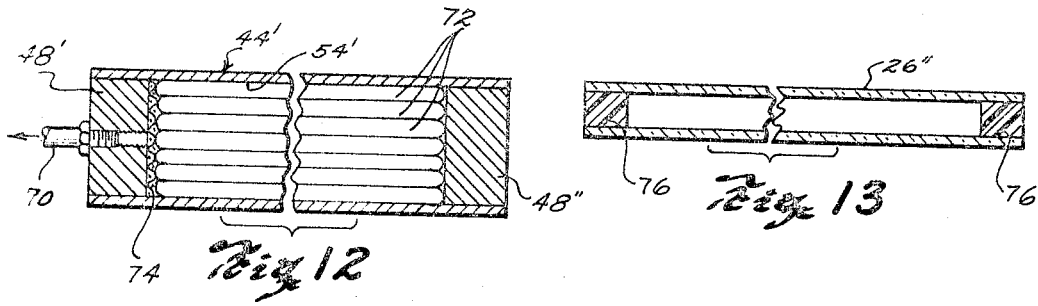
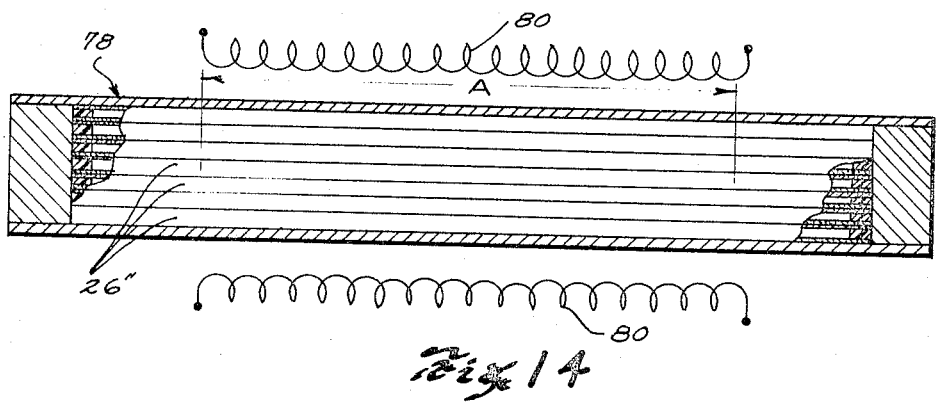
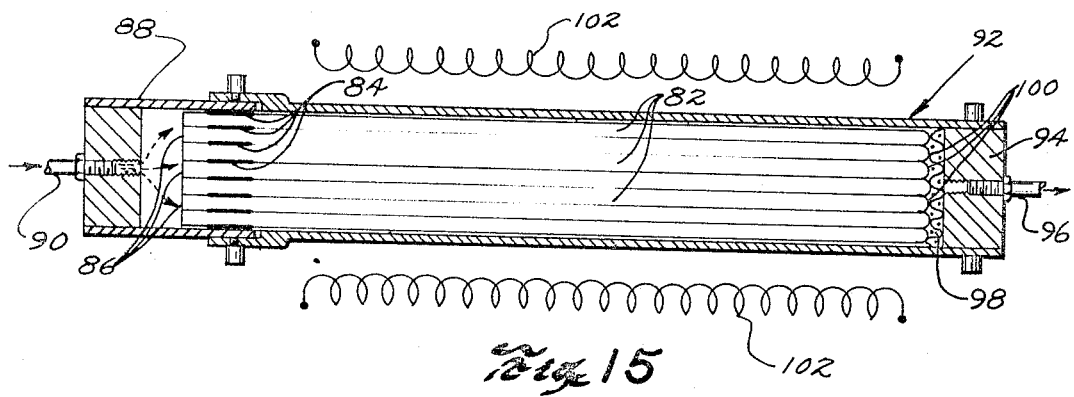
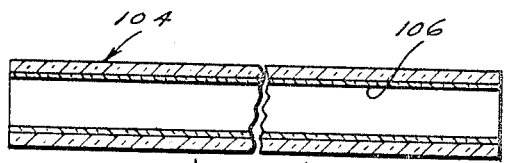
INVENTOR
HENRY B. COLE 3,331,670
METHOD OF MAKING MULTICHANNELLED ELECTRON MULTIPLIER COMPONENT
Henry B. Cole, East Woodstock, Conn., assignor to American Optical Company, Southbridge, Mass., a voluntary association of Massachusetts
Filed Sept. 9, 1963, Ser. No. 307,401
4 Claims. (Cl. 65—4)

This invention relates to porous glass structures formed of a multiplicity of fused glass tubes and has particular reference to an improved method of making the same.

In the fabrication of fused multitube glass structures there has been the problem of differentiating between desired pores or channels extending through the tubes and unwanted spaces therebetween. Attempts to eliminate spaces between tubes of such structures were, heretofore, attended by problems of distortion and/or collapse of the tubes during fusion thereof. As attempts were made to reduce the thickness of the walls of the structure as compared to the open areas thereof these problems became more severe.

The present invention contemplates the making of porous glass structures formed of a multiplicity of glass tubes arranged in side-by-side relation with each other and so fused together that spaces between respective tubes are closed while the tube lumens which form pores or channels through the structure are in substantially parallel relation to each other and are of substantially uniform size and shape throughout the length of the structure.

An object of the present invention is to provide a simple, expedient and economical method of making improved multitube glass structures of the above character; to provide for closure and sealing of spaces between respective tubes of such structures; and to provide for the application of controlled uniform contact pressure on mating surfaces of the tubes during fusion in such manner as to effect uniform fusion of the tubes during closure of spaces therebetween without collapse of the tubes.

A further object is to provide for the making of glass multitube structures of the above character which are readily reproducible within close limits.

In attaining the aforesaid objects and others which may appear from the following description, the glass structures are formed in accordance with principles of the present invention by assembling a number of relatively long and thin glass tubes in side-by-side relation in a mold which will constrain the assembly against appreciable expansion as a whole. Tubes so constrained by the mold are heated to the fusing temperature of the component glasses and are caused to expand individually. The expansion may be caused by gas pressure internally of the tubes increasing independently of or at a greater rate than that of the external tube environment. As the tube glasses become heat softened, gas pressure inside the tubes increases and exceeds ambient pressure. Thus, respective tubes of the assembly expand to close spaces therebetween. In addition to effecting closure of such spaces, the force resulting from gas pressure internally of the individual tubes provides a predetermined contact pressure between mating surfaces of the tubes to produce uniform fusion of adjoining side walls of the tubes.

In accordance with one aspect of the invention, single or multitubes (a number of tubes prefused in side-by-side relation with each other) may be used in the fabrication of the porous glass structures. The tubes or multitubes to be assembled are sealed at opposite ends thereof at a temperature substantially below the fusing temperature of the tube materials so that gas or vapor entrapped therein may be utilized to produce the force necessary to effect expansion of the tubes when heated to fusing temperature.

The pressure which can be subsequently provided within the tubes or multitubes depends upon the temperature and pressure therein at the time the seal is made and upon the temperature used to accomplish fushion of the tubes or multitubes constrained in the mold. For example, glass tubing which can be fused at a temperature within the range of from 1100° F. to 1200° F. when sealed in normal room atmosphere at a temperature of approximately 68° F. with no pressure differential internally and externally thereof is subjected to an internal pressure of approximately three atmospheres when heated to the above-given fusing temperature. Greater pressures can be obtained in accordance with the principles of this invention by chilling the tubes during end sealing and/or by enclosing a medium therein which will vaporize below the fusing temperature. Also the tubes may be sealed under pressures greater than normal by sealing in an enclosed pressurized chamber.

A presently preferred method of sealing the ends of tubes or multitubes is to flame heat said ends until the glass softens sufficiently for surface tension to close the ends or an applied force causes closing and sealing of openings thereof. Alternatively the tubes or multitubes may be sealed with a cement or the like such as an epoxy resin. In such cases, however, extra tubing length should be provided so that cemented areas are not subjected to the high temperature zone used to effect tube fusion. Alternatively the tubes may be sealed by "pinch-off" technique in which the softened glass is pinched together by opposed nipping or shearing edges. As a further alternative, an assembly of tubes or multitubes can each be sealed at one end only and constrained within a mold with provision being made to apply gas pressure to opposite open ends of the tubes independently of the tube environment so as to cause expansion of individual tubes in the mold during fusion thereof.

Multitube glass structures fabricated in accordance with the principles of this invention may have pores or channels extending therethrough of substantially any desired size ranging from several thousands of an inch in diameter to as small as only a few microns in diameter. Such structures are of interest as fluid filters and also as a component of electron multiplier devices. For example, in one form of electron multiplier device, a porous glass structure is interposed between a cathode and an anode in an evacuated chamber. Electrons emitted by a photo-cathode or heated cathode are directed into the pores or channels of the structure and as they strike the side walls of the channels cause the emission of further electrons which are drawn toward the anode. In some cases, the channel walls may be coated or otherwise provided with a material which is capable of producing enhanced secondary emission. Successive collisions of the electrons along the length of the channels cause repeated secondary electron multiplication.

For use in electron multiplier devices, porous glass structures preferably embody from $10^5$ to $10^7$ pores or channels ranging in sizes from 10 to 50 microns in diameter with lengths of from 25 to 100 times their diameter. For other applications different channel sizes and lengths might be desirable and are readily provided in accordance with the principles of the present invention.

The present invention will be more fully understood by reference to the following detailed description which is accompanied by a drawing in which FIG. 1 is an enlarged fragmentary perspective view of an exemplifying glass structure;

FIG. 5 illustrates an assembly of sealed tubes in a mold which is adapted to constrain the assembly against expansion as a whole in accordance with the principles of the invention;

FIG. 6 is a transverse cross-sectional view illustrating furnace means in which the multitube assembly of FIG. 5 can be heat treated in accordance with the principles of the invention;

FIG. 7 is a perspective illustration of a fused multitube structure resulting from practice of the method of the invention;

FIG. 8 is an enlarged fragmentary cross-sectional view taken on line 8—8 of FIG. 7;

FIG. 9 illustrates in fragmentary form a mechanism by means of which the heating and drawing of a structure such as shown in FIG. 7 to a reduced cross-sectional size may be accomplished;

FIG. 10 is an enlarged perspective illustration of a multitube section resulting from the operation illustrated in FIG. 9 wherein said section is broken away between its opposite ends and has said opposite ends sealed;

FIG. 11 is a fragmentary transverse cross-sectional view of an assembly of a number of said multitube sections formed in accordance with the principles of the invention;

FIG. 12 is a longitudinal cross-sectional view of mold means broken away intermediate its opposite ends and containing an assembly of a number of glass tubes to be fused together in accordance with a modification of the invention;

FIG. 13 is an enlarged longitudinal cross-sectional view of a glass tube similar to FIG. 3 but having opposite ends thereof sealed in accordance with another aspect of the invention;

FIG. 14 illustrates a mold used in forming a fused multitube structure of a number of tubes such as shown in FIG. 13;

FIG. 15 illustrates an alternative arrangement for forming a fused multitube assembly in accordance with the principles of the invention; and FIG. 16 is an enlarged longitudinal cross-sectional view of a modified form of glass tube useful in practicing the process of the invention.

Figure 1:
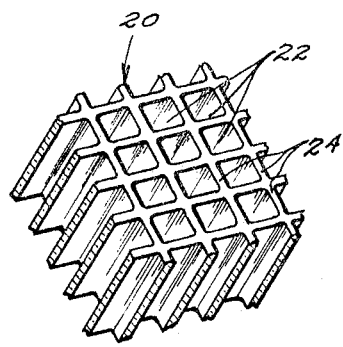

In FIG. 1 of the drawing, structure 20 having channels 22 extending therethrough is illustrative of a porous glass structure fabricated in accordance with the invention. Structure 20 is formed of a multiplicity of glass tubes fused together in side-by-side relation wherein respective side walls of the glass tubes are joined by fusion to provide walls 24 surrounding channels 22 of structure 20. Walls 24 of structure 20 when formed in accordance with the principles of this invention are substantially uniform in size and shape and free of interstices extending therethrough.

Figure 4:
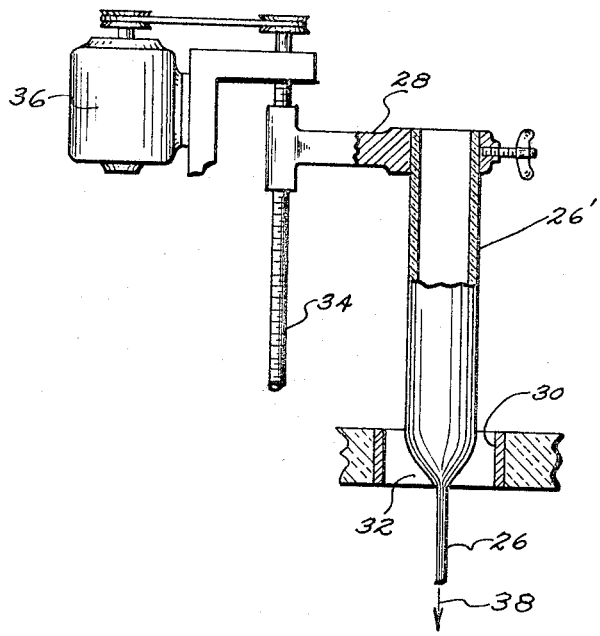
FIG. 4 illustrates a machine for forming tubes of desired relatively small cross-sectional size.

Commercially available soda lime glass tubing or the like or tubing formed of special materials capable of producing enhanced secondary electron emission can be used directly in the fabrication of the porous glass structures or such tubing can be drawn to a reduced cross-sectional size in the manner illustrated in FIG. 4 prior to fabrication of structure 20.

Figure 2:
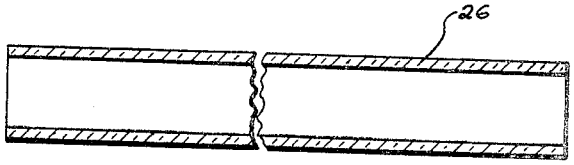
FIG. 2 is a greatly enlarged longitudinal cross-section, broken away intermediate its ends, of a tube destined for use in making multitube structures according to the principles of the present invention.

Tubing 26 (see FIGS. 2 and 3) as small as a few microns in diameter can be formed from a relatively large tube 26' of stock material having the overall diameter and wall thickness ratio desired of tubing 26. The drawing of tube 26' to form tube 26 is accomplished by supporting tube 26' adjacent one of its ends in holder 28 so as to depend approximately coaxially through heating ring 30. Heating ring 30 may be of any conventional design capable of heating tube 26' to a temperature suitable for drawing in a short zone 32 within heating ring 30. Ring 30 is heated to the desired operating temperature by electromagnetic induction, by resistance means (not shown) or by gas flames (not shown). Holder 28 is carried by lead screw 34 which, in turn, is rotationally driven by motor 36 in a direction such as to lower tube 26' into zone 32. Upon becoming heated to a temperature suitable for drawing, the depending end of tube 26' is drawn axially as indicated by arrow 38 at a rate so controlled as to produce tube 26 of desired cross-sectional size. At the same time, tube 26' is continually lowered by actuation of lead screw 34 at a rate so controlled as to keep pace with the removal of material from its depending end as tube 26 is progressively drawn out.

In accordance with one aspect of the present invention wherein the porous structure 20 is formed of a multiplicity of individual tubes 26, the tubes 26 whether formed as illustrated in FIG. 4 or selected from commercial stock material having the desired inner and outer diametrical sizes are cut transversely to substantially equal lengths. Tubes 26 have an inner diametrical size approximately equal to that desired of the pore size of the ultimate structure 20 to be formed and a wall thickness of approximately one half the thickness desired of walls 24 of structure 20.

With the multiplicity of tubes 26 at room temperature or chilled to below normal room temperature, opposite ends thereof are sealed to entrap the atmosphere therein.

Figure 3:
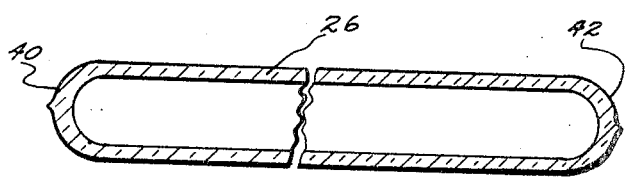
FIG. 3 is a view similar to FIG. 2 of the tube with opposite ends thereof sealed in accordance with one aspect of the invention.

A presently preferred manner of sealing opposite ends of tubes 26 is to flame seal the same causing said ends to quickly soften and become closed by the forces of surface tension without becoming appreciably heated at any appreciable distance from the end. For purposes of illustration, a tube 26 is shown in FIG. 3 as having opposite ends 40 and 42 thereof heat sealed.

It will become apparent hereinafter that, in accordance with the principles of the present invention, air or gas entrapped within sealed tubes 26 is utilized to exert an outwardly directed force on the side walls of respective tubes to expand the tubes and provide contact pressure on mating surfaces of a constrained bundle thereof when the bundle is heated to softening and fusing temperatures. Accordingly, the pressure which can be subsequently provided within the sealed tubes at the fusing temperature thereof will depend upon and can be controlled by the temperature and pressure in respective tubes at the time the seal is made. Since tubes 26 in a constrained bundle thereof are permitted to expand only an amount sufficient to fill out and close interstices therebetween, the volume of entrapped air or gases therein is not appreciably changed. Thus, gas pressure within the tubes is substantially proportional to the absolute temperature of the mass of gas. With tubes 26 of conventional soda lime glass which will fuse readily at approximately 1180° F. (910° K.) an internal pressure greater than three atmospheres can be created therein at the mentioned fusing temperature simply by sealing the tubes at a temperature of approximately 68° F. (293° K.) in one atmosphere of pressure with no pressure differential internally or externally thereof.

It has been found that an internal pressure of 3 atmospheres at fusing temperature will produce desirable results in accordance with the principles of the invention. However, greater internal tube pressures might be preferred or required in some instances. This can be readily accomplished by chilling the tubes prior to end sealing thereof with solidified carbon dioxide or by placing said tubes in refrigerated acetone. Alternatively, carbon dioxide in liquid form or solid state, carbon tetrachloride, water or other well-known constituents which will sublimate or vaporize at temperatures below fusing temperatures of the tubes can be placed within the tubes prior to end sealing thereof to produce internal pressure within the tubes when fusion thereof is effected as will be described in detail hereinafter.

Referring more particularly to the actual formation of a structure 20 such as shown in FIG. 1 utilizing a multiplicity of tubes 26 which have been end sealed as described above, it will be seen in FIG. 5 that mold 44 is provided to receive a multiplicity of such tubes. Mold 44 is designed to constrain a bundle of a predetermined number of tubes 26 placed in intimate side-by-side relation therein in such manner as to prevent appreciable expansion of the bundle as a whole during subsequent heating and fusion thereof.

In the particular embodiment shown for purposes of illustration, mold 44 comprises side panels 46 which are secured at opposite ends thereof to end blocks 48 by cap screws 50 passing through clearance holes in side panels 46 and into tapped holes 52 in end blocks 48 may be used though alternative equivalent clamping means may be employed. Panels 46 each have one side lip 47 overlying an adjacent panel 46. Thus, bulging of mold 44 intermediate its ends may be prevented without utilizing excessively heavy stock which would lengthen the heating cycle used to expand and fuse tubes 26. Panels 46 and blocks 48 are formed of stainless steel or a like material capable of withstanding the relatively high temperatures used in glass fusing operations and each have substantially the same coefficients of expansion so as to prevent appreciable distortion of mold 44 when subjected to glass fusing temperatures. As shown in FIGS. 5 and 6, panels 46 and end blocks 48 provide mold cavity 54 in which tubes 26 are placed longitudinally with opposite ends thereof preferably abutting respective blocks 48. A number of tubes sufficient to fill out cavity 54 is used. Cavity 54 is preferably lined with parting layer 56 of material which does not stick to glass. Gold foil or asbestos paper or the like may be used as such a parting layer.

In filling cavity 54 of mold 44 with glass tubes 26, three panels 46 are secured to end blocks 48 to form three sides of cavity 54 and permit placement of tubes 26 therein whereupon the fourth panel is secured in position to close cavity 54. By rendering all panels 46 removable from end blocks 50 in the mold construction illustrated, the fused assembly of tubes 26 can be readily removed from mold 44 as will be described hereinafter.

When cavity 54 of mold 44 is filled to capacity with tubes 26 and all panels 46 are secured in place, the complete assembly is heated to fusing temperature of the particular glasses of which tubes 26 are composed and held at that temperature for a period sufficient to provide uniform heating throughout the thickness of the bundle of tubes 26. As shown by way of example, mold 44 containing tubes 26 can be placed in a furnace 58 provided with conventional electrical heating coils 60 to effect fusion of tubes 26 or, alternatively, the mold 44 can be heated by gas flames (not shown).

When heated to fusing temperature, the particular aeriform fluid or other vaporizable substance entrapped within each sealed tube 26 will produce pressure therein which increases with the absolute temperature of the fluid and thereby cause expansion of the tube. Thus, walls of respective tubes of the assembly are forced toward each other and cause a contact pressure to be applied to mating surfaces thereof. In this way, interstices between tubes 26 of the assembly are closed by plastic flow of the heat-softened glass and uniform fusion of mating surfaces of respective tubes will be effected. The fused assembly of tubes 26 is then allowed to cool slowly to avoid thermal shock and possible fracturing thereof. When cooled sufficiently, the assembly is removed from mold 44. Removal of the fused assembly of tubes 26 from mold 44 is readily accomplished by removal of screws 50 whereby the mold is dismantled so that side panels 46, end blocks 48 and parting layers 56 are withdrawn from around the fused assembly of tubes 26.

In FIG. 7 a completed assembly 62 of fused tubes 26 resulting from the process described above is illustrated and in FIG. 8 an enlarged fragmentary cross-section thereof is shown to illustrate the wall construction resulting from fusion of side walls of respective tubes 26. Assembly 26 can be cut transversely into sections of any desired lengths, each section, except for the end sections, having uniform channels extending through its entire length. If it is desired to utilize substantially the full length of assembly 62 as a single unit, opposite ends only thereof can be cut transversely or ground away to open channels extending through the assembly.

While it is possible to form tubes 26 to practically any desired reduced cross-sectional size by the practice of the drawing technique illustrated in FIG. 4 and described above, considerable difficulty would attend the handling of tubes as individual pieces which were drawn as small as only a few microns in diameter. However, for some uses such as in electron multiplier devices or the like, it would be required or desirable to have the size of each channel 22 in a structure of the type illustrated in FIGS. 1, 7 and 8, as small as only a few microns (i.e. from 10 to 50 microns) in diameter. Accordingly, the present invention contemplates the making of such structures without requiring individual handling of exceptionally small tubes.

In accordance with this aspect of the present invention, assembly 62 with the ends removed is heated and drawn to a reduced cross-sectional size. This can be accomplished as shown in FIG. 9 by lowering assembly 62 endwise into heating ring 64 which is similar to heating ring 30 in FIG. 4. In a manner analogous to the drawing of tubes 26, assembly 62 is drawn to a reduced cross-sectional size to form fiber-like multitube structure 66. In this way, a 10 to 1 or greater reduction in size of channels extending through assembly 62 can be accomplished with the fiber-like multitube structure itself being of a cross-sectional size which can be conveniently handled. It has been found that such drawing can be accomplished without substantial distortion of the assembly itself or of the channels or thin walls.

Fiber-like multitube structure 66 is cut transversely into a number of sections 68 of substantially equal lengths which are each heat sealed at opposite ends thereof in the manner described with relation to tubes 26 described hereinabove. One such section 68 is illustrated in FIG. 10. In sealing opposite ends of sections 68, air, gases or vaporizable substances entrapped within channels extending therethrough cause expansion of sections 68 when they are subsequently heated to fusing temperature.

In the fabrication of a porous glass structure of the type illustrated in FIG. 1, formed of a multiplicity of sealed sections 68, such sections are placed in side by side relationship in cavity 54 of mold 44 in the manner described above with relation to tubes 26. Mold 44 containing the assembly of sections 68 is heated to the fusing temperature of the glasses of sections 68 whereupon pressure created by heated gases or the like entrapped in sections 68 produces contact pressure on mating surfaces of sections 68 causing uniform fusion thereof and closure of spaces or interstices therebetween.

Upon slow cooling and removal of the fused assembly of sections 68 from mold 44, the assembly, like assembly 62 in FIG. 7, can be cut transversely into sections of any desired lengths to fulfill the requirements of use thereof. For example, for use in electron multiplier devices, such structures might be cut to lengths of from 25 to 100 times the transverse dimensions of the individual pores or channels extending therethrough.

It should be understood that the above described tube drawing, sealing, assembling and fusing operations described with relation to FIGS. 9, 10, and 11 may be repeated a number of times when it is desired to further reduce the size of pores or channels and to increase the number thereof per unit area in the resultant fused structure.

In FIG. 12 there is illustrated a modification of the invention wherein air or gases are evacuated from between sealed tubes or multitube sections being fused together in accordance with the principles of the present invention. This is accomplished by providing mold 44' similar to mold 44 wherein one end block 48' is fitted with vacuum line 70 communicating with the interior or cavity 54' of mold 44'. Tubes or multitube sections 72 (similar to tubes 26 in FIG. 4 or multitube section 68 in FIG. 10) are placed in end contact with one end block 48" and held slightly spaced from end block 48' by the provision of a relatively thin foraminous member 74 placed against block 48'. Member 74 can be in the form of a wire mesh screen, as illustrated, or any material which will permit communication of the spaces between tubes or multitube sections 72 with vacuum line 70 in block 48'. Thus, during heating of tubes or multitube sections 72 in mold 44' and immediately prior to fusion thereof, a vacuum produced in line 70 will evacuate air and gases from between respective tubes or multitube sections 72 thereby preventing entrapment of such air or gases in fused wall parts of the resultant structure.

Alternatively, line 70 without a vacuum applied thereto can be used to inject a gas such as oxygen into mold cavity 54' prior to fusion of tubes 72 so as to cause diffusion of the gas throughout the tube environment. In this way, at a temperature slightly below the actual fusing temperature of tubes 72, the oxygen will promote oxidation of organic matter between tubes 72 and provide for clean interfacial fusion of adjoining surfaces of tubes 72 during subsequent fusion thereof. Immediately prior to and during the time of actual fusion of tubes 72, a vacuum in line 70 would preferably be used for the purpose set forth hereinabove. Other gases can be injected into mold cavity 54' through line 70 if desired. An inert gas such as helium, for example, can be used to displace air or other gases in mold cavity 54'. The presence of helium between tubes 72 does not inhibit fusion thereof. Helium entrapped with the assembly of tubes 72 at the time of fusion thereof will be absorbed into the glasses of tubes 72.

In accordance with a further aspect of this invention, tubes used to form the multitube structure can be end sealed with a cement or epoxy resin rather than heat sealed as described above. This would also apply to multitube sections such as illustrated in FIG. 10. In FIG. 13, a single tube 26" is illustrated in greatly enlarged cross-section as having its opposite ends sealed with a cement or epoxy resin 76. In FIG. 14 a number of tubes 26" are assembled in a bundle in mold 78 for fusion thereof in accordance with the principles of the invention. Mold 78 is similar to mold 44 described hereinabove and may if desired be modified to incorporate a vacuum system such as described with relation to mold 44' in FIG. 12. When fusing a bundle of tubes 26" which have been end sealed with epoxy resin or the like, extra tubing length is provided so that sealed ends of tubes 26" can be positioned outside the high temperature zone wherein fusion of the intermediate portion of the bundle is accomplished. This is illustrated in FIG. 14 wherein heating coils 80 which are used to heat the bundle of tubes 26" to fusing temperature extend only throughout intermediate section A of the length of the bundle. Thus, opposite ends of tubes 26" are not subjected to the high fusing temperature. Ceramic cements or sealing mediums which will withstand glass fusing temperatures and provide effective seals for tubes 26" at such temperatures can be used. In such cases, the entire length of tubes 26" in a bundle thereof are fused in a manner similar to that described with relation to the formation of fused assembly 62 in FIG. 7.

Further, in accordance with the principles of the invention, glass tubes each having only one sealed end can be used to form a fused structure of the type illustrated in FIG. 1. As illustrated in FIG. 15, this is accomplished by bundling a number of tubes 82 in side-by-side relationship and providing a seal 84 of cement or epoxy resin or the like between respective tubes 82 outwardly thereof adjacent their open end 86. A tubulated end piece 88 is fitted over the bundle of tubes 82 adjacent open ends 86 and attached to the bundle preferably with the material of seal 84. Endpiece 88 is fitted with a compressed air line or the like 90. The assembly of tubes 82 is placed in mold 92 which is generally similar to molds 44, 44' and 78 described above. Mold 92 has end block 94. End piece 88 on the assembly of tubes 82 provides closure means for the opposite end of mold 92. End block 94 can be similar to end blocks 48 in FIG. 5 or fitted with a vacuum line 96 as illustrated. In the embodiment illustrated in FIG. 15, sealed ends 100 of tubes 82 abutt screen 98 whereby screen 98 permits evacuation of air and gases from between tubes 82 during heating thereof in the manner described with relation to the modification of the invention illustrated in FIG. 12.

When heated to softening and fusing temperature by means of electrical heating coils or the like 102, tubes 82 constrained in mold 92 are caused to expand in accordance with the principles of the invention by the introduction of compressed air thereinto through open ends 86. As it can be seen, compressed air from line 90 is prevented by seal 84 from entering interstices between fibers while, at the same time environmental air and gases in such interstices is withdrawn by vacuum line 96. Thus, when the glasses of tubes 82 are heated to softening and fusing temperature and the assembly thereof is constrained against appreciable expansion as a whole in mold 92, pressure applied internally of tubes 82 tending to cause individual expansion thereof closes interstices between tubes 82. At the same time, this internal pressure produces a contact pressure on mating surfaces of tubes 82 thereby effecting uniform fusion of side walls of tubes 82.

In all phases of the invention shown and described herein, mutitube fiber-like structures such as shown in FIG. 10 or single tube elements such as shown in FIGS. 3, 13 or 15 can be substituted, one for the other, in the fabrication of a structure of the type illustrated in FIG. 1.

Since it may be desirable that walls 24 of structure 20 (FIG. 1) be given special properties rendering them capable of producing enhanced secondary electron emission when structure 20 is used as a component of an electron multiplier device, tubes having an inner coating of material such as caesium or a caesium containing glass or other material capable of producing secondary electron multiplication can be used in the fabrication of structure 20. In FIG. 16 an enlarged longitudinal cross-section of such a tube 104 having an inner coating 106 of material capable of producing secondary electron multiplication is illustrated. A multiplicity of tubes 104 can be substituted for tubes 26 in the process of the invention.

I claim:

1. The method of making a multichannelled electron multiplier component comprising the steps of:
    sealing within each of a multiplicity of elongated tubes having glass walls formed at least in part of secondary electron emissive material a medium which is expansible on being heated;
    placing said tubes under rigid constraint in prearranged tightly bundled side-by-side parallel relationship with each other, there being undesired interstices between said tubes; and
    heating said constrained tubes to a temperature sufficient to soften the walls thereof and fuse one to another whereby, under the influence of said heating, expansion of said medium effects corresponding expansion of said tubes substantially only to the extent of closing said interstices and integrating by fusion said walls of said tubes to form said component.

2. The method as recited in claim 1 further including the step of:

evacuating air and gases from said interstices during said heating of said tubes.

3. The method as recited in claim 1 wherein said expansible medium is a fluid.

4. The method as recited in claim 1 wherein said expansible medium is a heat vaporizable solid.

References Cited

UNITED STATES PATENTS

| | | | |
|---|---|---|---|
| 1,926,552 | 9/1933 | Morgan | 65—4 X |
| 2,433,546 | 12/1947 | Cornelius. | |
| 2,608,722 | 9/1952 | Stuetzer. | |
| 2,752,731 | 7/1956 | Altosaar | 65—23 |
| 3,224,851 | 12/1965 | Hicks | 65—4 |
| 3,248,464 | 4/1966 | Telkes. | |

DONALL H. SYLVESTER, *Primary Examiner.*

F. W. MIGA, *Assistant Examiner.*